United States Patent
Fiore, Jr.

(10) Patent No.: US 8,231,136 B2
(45) Date of Patent: Jul. 31, 2012

(54) SYSTEM AND METHOD FOR MOUNTING DIFFERENT TYPES OF INFANT CARRIERS ON A SUPPORT STRUCTURE

(75) Inventor: Joseph F. Fiore, Jr., Lebanon, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 393 days.

(21) Appl. No.: 12/540,911

(22) Filed: Aug. 13, 2009

(65) Prior Publication Data

US 2010/0044985 A1 Feb. 25, 2010

Related U.S. Application Data

(60) Provisional application No. 61/189,673, filed on Aug. 21, 2008.

(51) Int. Cl.
*B62B 7/14* (2006.01)
*B62B 9/28* (2006.01)

(52) U.S. Cl. ........ 280/648; 280/649; 280/650; 280/657; 280/47.38; 280/47.39

(58) Field of Classification Search ............. 280/33.993, 280/642, 643, 647, 648, 649, 650, 657, 47.25, 280/47.38, 47.39, 47.4, 47.41, 79.2
See application file for complete search history.

(56) References Cited

U.S. PATENT DOCUMENTS

| | | | |
|---|---|---|---|
| 4,398,748 A * | 8/1983 | Duvignacq | 280/644 |
| 4,836,573 A * | 6/1989 | Gebhard | 280/644 |
| 6,446,990 B1 * | 9/2002 | Nania et al. | 280/47.371 |
| 6,478,327 B1 * | 11/2002 | Hartenstine et al. | 280/642 |
| 6,572,134 B2 * | 6/2003 | Barrett et al. | 280/650 |
| 7,497,461 B2 * | 3/2009 | Emerson | 280/642 |
| 7,513,512 B2 * | 4/2009 | Yoshie et al. | 280/47.38 |
| 7,658,399 B2 * | 2/2010 | Van Dijk | 280/642 |
| 7,686,322 B2 * | 3/2010 | Longenecker et al. | 280/642 |
| 7,712,765 B2 * | 5/2010 | Chen et al. | 280/642 |
| 7,775,532 B2 * | 8/2010 | Chen et al. | 280/47.4 |
| 7,832,755 B2 * | 11/2010 | Nolan et al. | 280/642 |
| 7,878,527 B2 * | 2/2011 | Popp | 280/647 |
| 7,938,435 B2 * | 5/2011 | Sousa et al. | 280/658 |
| 2001/0013689 A1 * | 8/2001 | Cone et al. | 280/47.41 |
| 2004/0032103 A1 * | 2/2004 | Hsia | 280/47.38 |

(Continued)

FOREIGN PATENT DOCUMENTS

CN 200420083534.7 9/2004

(Continued)

*Primary Examiner* — John R Olszewski
(74) *Attorney, Agent, or Firm* — Davd I. Roche; Baker & McKenzie LLP

(57) ABSTRACT

A system and method are provided for detachably mounting different types of infant carriers on a support structure. The system includes a mounting platform provided on a frame of the support structure. The mounting platform includes a first and second coupling structure. The first coupling structure is adapted to engage with a first fastener structure of a first infant carrier, whereas the second coupling structure is adapted to engage with a second fastener structure of a second infant carrier. The mounting platform also includes a rotary support base that can be rotated relative to the frame between a first position and a second position. In the first position, the support base enables engagement of the first coupling structure with the first fastener structure. In the second position, the support structure enables engagement of the second coupling structure with the second fastener structure.

16 Claims, 7 Drawing Sheets

U.S. PATENT DOCUMENTS

| | | |
|---|---|---|
| 2004/0094923 A1* | 5/2004 | Eros et al. .................. 280/47.38 |
| 2007/0057486 A1* | 3/2007 | Worth et al. .................. 280/647 |
| 2008/0012268 A1 | 1/2008 | Lee |
| 2008/0231022 A1* | 9/2008 | Hu et al. ....................... 280/643 |
| 2009/0127827 A1* | 5/2009 | Pike et al. ..................... 280/648 |
| 2009/0243260 A1* | 10/2009 | Longenecker et al. ....... 280/642 |
| 2009/0295128 A1* | 12/2009 | Nagelski et al. .............. 280/642 |

FOREIGN PATENT DOCUMENTS

| | | |
|---|---|---|
| CN | 20050003600 A1 | 2/2005 |
| CN | 200520055399.X | 3/2005 |
| CN | 200620165613.1 A1 | 12/2006 |
| EP | 1693277 A2 | 8/2006 |
| EP | 1970284 A1 | 9/2008 |

* cited by examiner

SYSTEM AND METHOD FOR MOUNTING DIFFERENT TYPES OF INFANT CARRIERS ON A SUPPORT STRUCTURE

RELATED APPLICATION

This application claims priority of provisional application No. 61/189,673, filed on Aug. 21, 2008.

FIELD OF THE INVENTION

The present invention relates to infant care apparatuses, and more specifically to a support structure and method that can accept the mount of different types of infant carriers thereon.

DESCRIPTION OF THE RELATED ART

A conventional stroller apparatus is usually configured to have a seat attached to a frame of the stroller apparatus. However, certain contexts of use may also call for a frame structure that can conveniently accept detachable fastening of an infant car seat on the frame of the stroller apparatus. For example, suppose the infant is sleeping in the infant car seat and the caregiver wishes to transport the infant with the stroller. In this case, it may be desirable to have a frame structure that can accept placement of the infant car seat so as to avoid disturbing the sleeping infant during the transfer to the stroller apparatus. To meet this demand, certain commercialized strollers have a seat area that can accept the detachable assembly of an infant car seat. Other variant strollers may only have a frame structure without seat elements.

Unfortunately, the above approaches may not be satisfactory as a user, at the time of purchase, will face the dilemma of whether to purchase either a frame/seat combination stroller, or a stroller without seat element. In an alternative, the user could also purchase both of the above strollers, which increases money expense and requires cumbersome operation of two strollers.

Accordingly, there is presently a need for a support structure such as a stroller that can accommodate multiple infant carriers, and address at least the foregoing issues.

SUMMARY OF THE INVENTION

The present application describes a system and method for detachably mounting different types of infant carriers on a support structure. In one embodiment, the support structure comprises a frame having an accommodation space, and a mounting platform provided on the frame. In addition, the mounting platform includes a first coupling structure adapted to engage with a first fastener structure of a first infant carrier placed in the accommodation space, a second coupling structure adapted to engage with a second fastener structure of a second infant carrier placed in the accommodation space, and a support base operable to rotate relative to the frame between a first position and a second position. The first position of the support base enables engagement of the first coupling structure with the first fastener structure, and the second position of the support base enables engagement of the second coupling structure with the second fastener structure.

In another embodiment, a method of using the support structure is described. The method comprises rotating the support base to a first position to provide clearance for engagement of the first coupling structure, locking the support base in the first position, placing a first infant carrier having a first fastener structure in an accommodation space of the frame, and engaging the first fastener structure with the first coupling structure. In some variant embodiments, the method further comprises disengaging and removing the first infant carrier, rotating the support base from the first position to a second position for enabling engagement of the second coupling structure, locking the support base in the second position, placing a second infant carrier having a second fastener structure in the accommodation space of the frame, and engaging the second fastener structure with the second coupling structure.

At least one advantage of the system and method described herein is the ability to configure the support structure for accommodating different types of infant carriers. Accordingly, more versatile use of the support structure is advantageously permitted.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

The present application describes a system and method for detachably mounting different types of infant carriers on a support structure. The system includes a mounting platform provided on a frame of the support structure. The mounting platform includes a first and second coupling structure. The first coupling structure is adapted to engage with a first fastener structure of a first infant carrier, whereas the second coupling structure is adapted to engage with a second fastener structure of a second infant carrier. The mounting platform also includes a rotary support base that can be rotated relative to the frame between a first position and a second position. In the first position, the support base provides clearance for the first coupling structure to engage with the first fastener structure. In the second position, the support structure provides clearance for the second coupling structure to engage with the second fastener structure. Examples of the support structure may include a stroller, jogger, seat base, or the like. Examples of different types of infant carriers may include an infant car seat, detachable stroller seat or basket, cradle, or the like.

Figure 1:
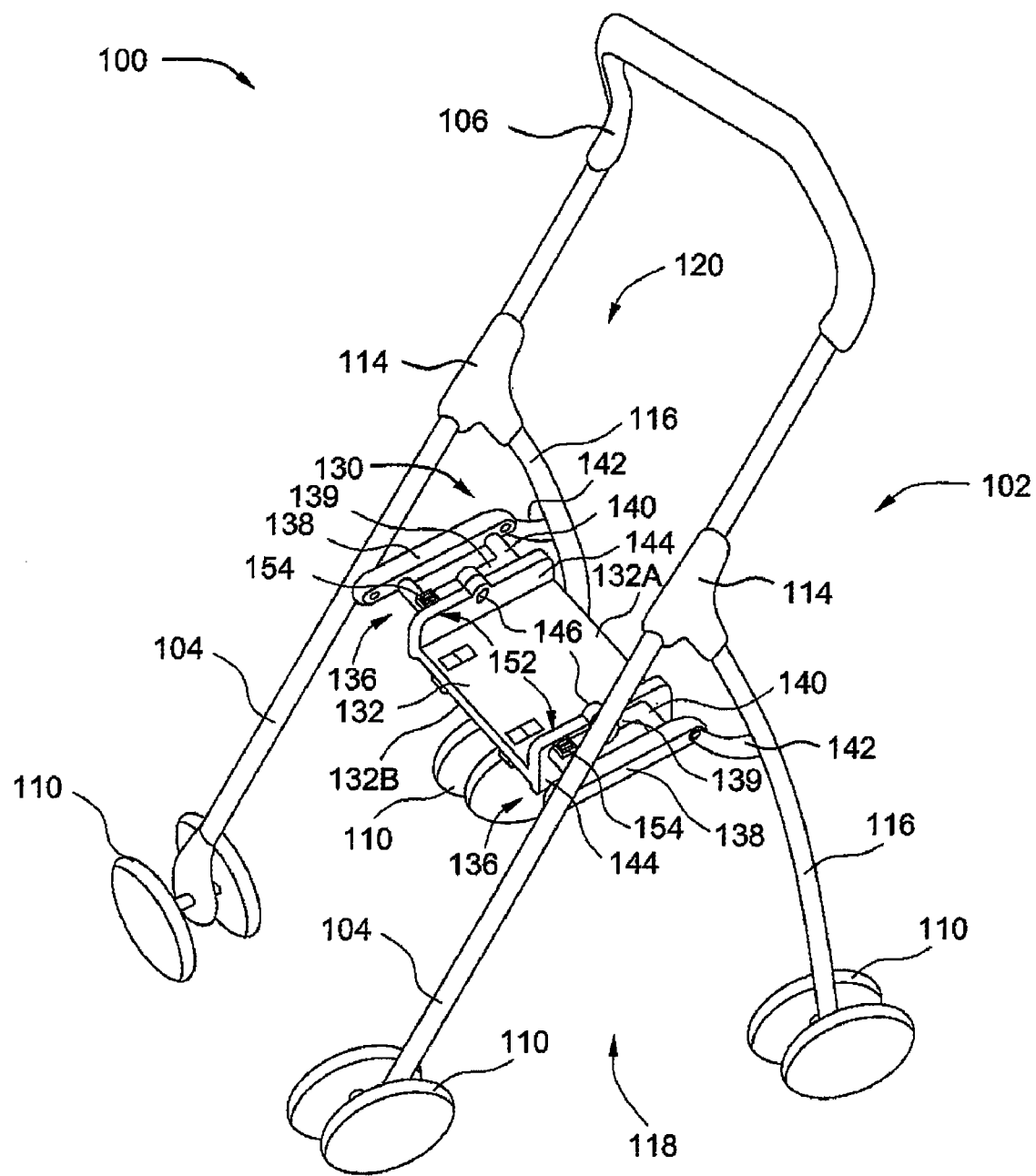
FIG. 1 is a schematic view illustrating a support structure suitable for accommodating different types of infant carriers, according to one embodiment of the present invention.

FIG. 1 is a schematic view illustrating a support structure 100 suitable for accommodating at least two different types of infant carriers, according to one embodiment of the present invention. The support structure 100 is exemplary a baby stroller that can include a frame 102. In one embodiment, the frame 102 may be made of rigid materials, such as metal, injection molded plastic materials, or a combination thereof. The frame 102 may include two front legs 104 that are assembled parallel and spaced apart from each other. A first end of each front leg 104 may be coupled with a handle member 106, and a second end of each front leg 104 may be provided with wheels 110. In some embodiment, each front leg 104 may also be formed by assembling multiple telescopic tube sections that can slide parallel for either shortening or deploying the front leg 104. An intermediary portion of each front leg 104 can be assembled with a joint 114 that is coupled with a rear leg 116. Each rear leg 116 may have a bottom end that is also coupled with wheels 110. Each pair of the front and rear legs 104 and 116 on each side of the frame 102 forms a fork structure 118 adapted to provide stable support. In one embodiment, each joint 114 can also have a mechanism operable to fold the front and/or rear leg 104/116 for facilitating storage of the frame 102 in a collapsed state. A gap between the two fork structures 118 defines an accommodation space 120 in which an infant carrier may be placed and assembled with amount platform 130.

As shown in FIG. 1, the mount platform 130 is assembled between the two fork structures 118. The mount platform 130 can include a support base 132, and a set of two brackets 136 that oppositely secure the support base 132 to each of the fork structures 118. In one embodiment, each bracket 136 can include two parallel bars 138 and 139 linked with each other by spaced-apart transversal rods 140. A first end of the bar 138 can be coupled with the front leg 104, whereas an opposite second end of the bar 138 is coupled with the rear leg 116 through an arm 142. In one embodiment, pivotal joints may be used for connecting the bar 138 with the front leg 104 and the arm 142, as well as for connecting the arm 142 between the bar 138 and rear leg 116. Such assembly structure can facilitate folding of the bracket 136 along with the frame 102 when the support structure 100 is collapsed for storage. As described in more details hereinafter, a portion of each bracket 136 may also be configured as a first coupling structure of the mounting platform 130 adapted to engage with a first fastener structure of a first infant carrier.

Figure 2:
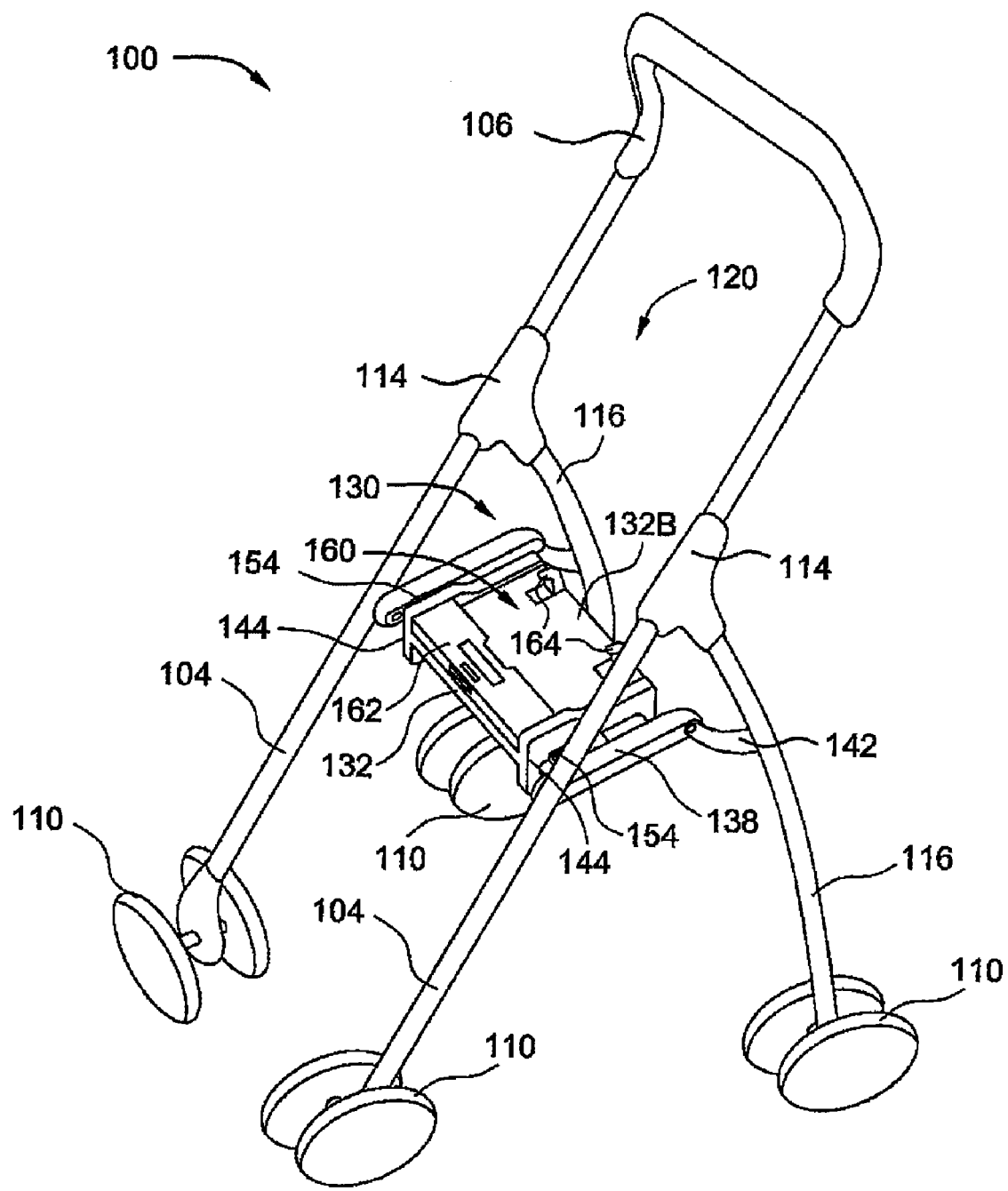
FIG. 2 is a schematic view illustrating the support structure of FIG. 1 with the mounting platform in a different configuration.

Referring again to FIG. 1, the support base 132 may have a plate shape including two side flanges 144 protruding approximately perpendicular from opposite first and second surfaces 132A and 132B of the support base 132. Each flange 144 is adapted to pivotally connect with one associated bracket 136. In one embodiment, a rivet, pin, or like element may be engaged through corresponding holes in each flange 144 and associated bar 139 to define a rotation axle 146 located in an approximately horizontal plane. The support base 132 can thereby be rotated about the rotation axle 146 between at least a first position and a second position for respectively attaching a first infant carrier and a second infant carrier. FIG. 1 illustrates the first position of the support base 132 adapted to accept the attachment of a first infant carrier, whereas FIG. 2 illustrates the second position of the support base 132 rotated 180 degrees from the first position for attaching a second infant carrier. A more detailed description of how the mounting platform 103 can attach with the first and second infant carriers will be illustrated hereinafter with reference to FIGS. 5-7.

Referring again to FIGS. 1 and 2, a latch 152 may also be provided to lock and unlock the support base 132 in each of the first and second positions. In one embodiment, the latch 152 may include a locking bolt 154 that is movably assembled on one or both of the opposite brackets 136. Under a spring action, each locking bolt 154 may engage through a corresponding opening formed through each flange 144 of the support base 132 for blocking rotation of the support base 132 about the rotation axle 146. When the position of the support base 132 is to be changed, a user can manually disengage the locking bolt 154, and then rotate the support base 132 until the support base 132 reaches either the first or second position, as illustrated in FIGS. 1 and 2. The locking bolt 154 can then be urged by the spring action to engage with another corresponding opening through the flange 144 for locking the support base 132. While the illustrated embodiment mounts the latch 152 on the brackets 136, alternate embodiments may also assemble the latch on the support base 132 in a configuration that can be accessible from either of the first and second surface 132A and 132B.

Figure 6:
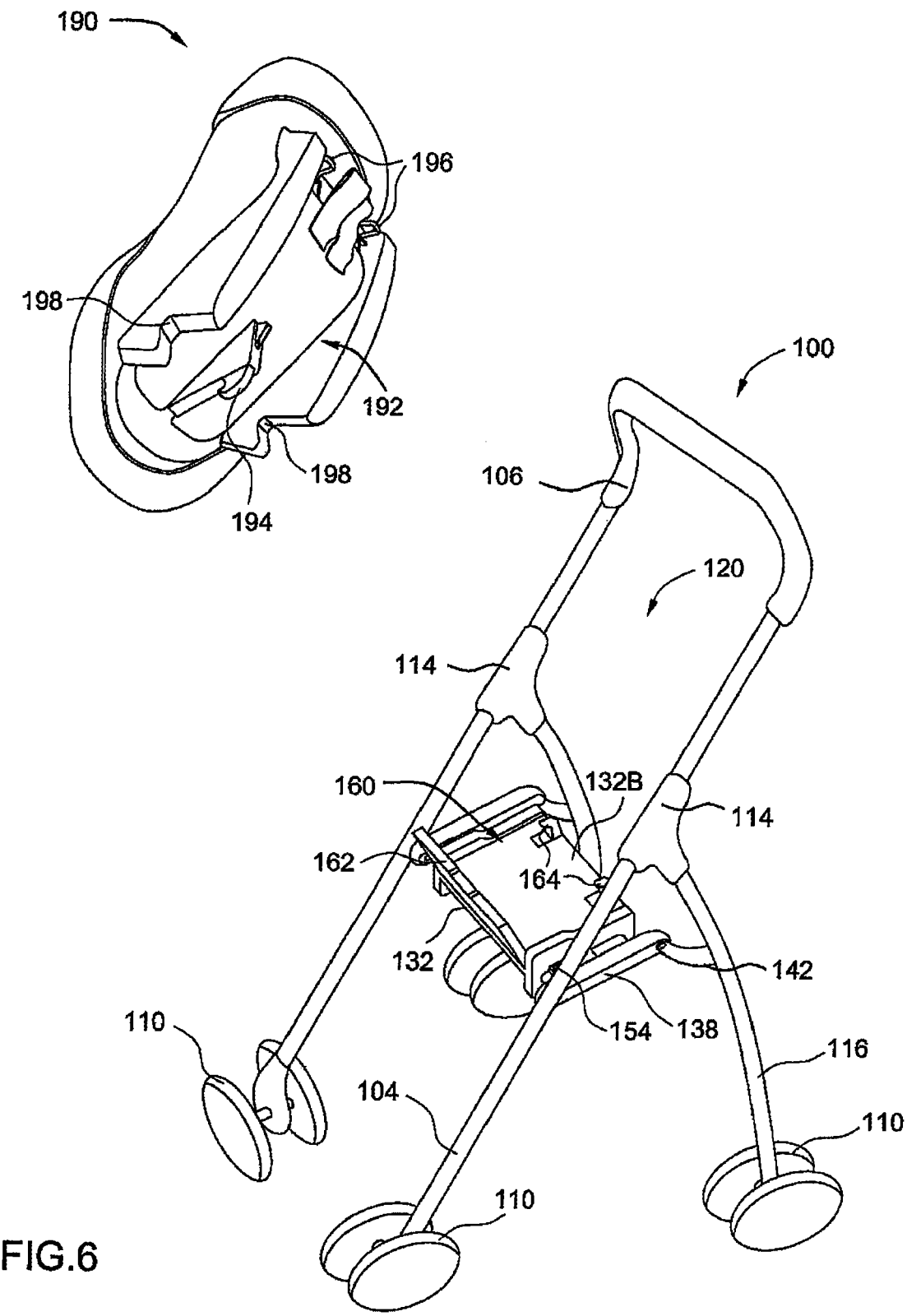
FIG. 6 is a schematic view illustrating the attachment of a second infant carrier on the mounting platform according to one embodiment of the present invention.
Figure 7:
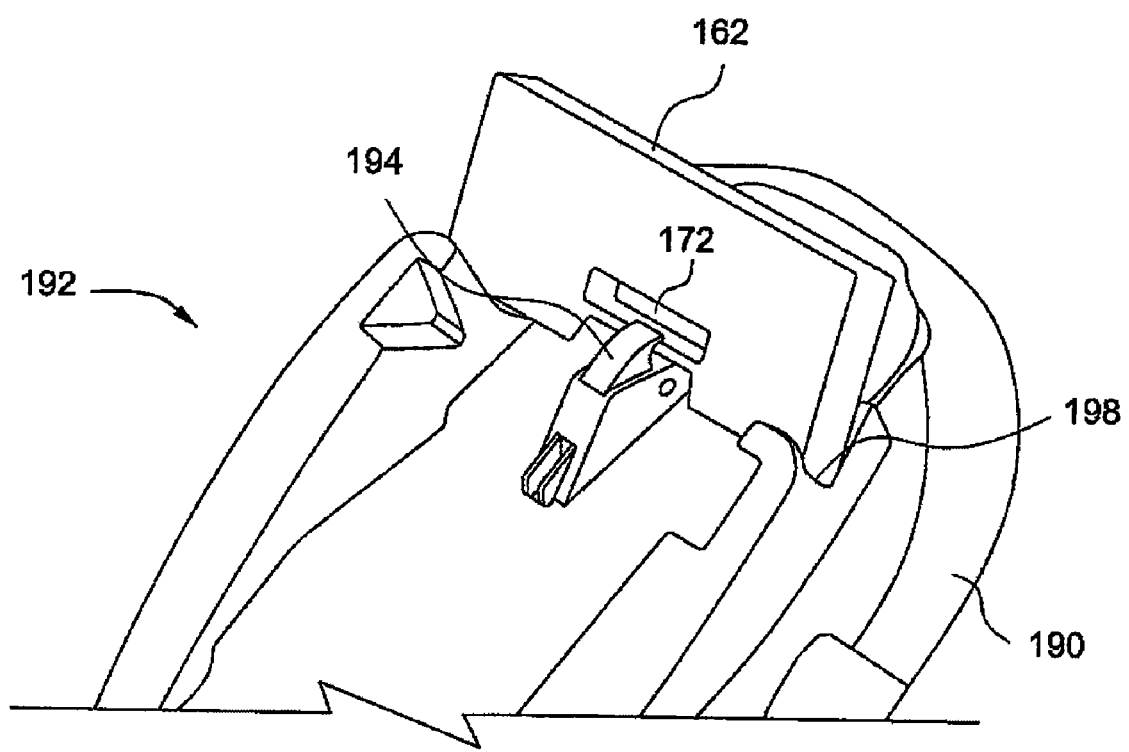
FIG. 7 is a schematic enlarged view illustrating how the pivotal panel can be engaged with a second fastener structure of the second infant carrier, according to one embodiment of the present invention.

As shown in FIG. 2, the second surface 132B of the support base 132 is provided with a second coupling structure 160 adapted to engage with a second fastener structure of a second infant carrier (FIGS. 6 and 7). In one embodiment, the second coupling structure 160 can include a pivotal panel 162 and hooks 164. The pivotal panel 162 may be mounted proximate to a front end of the second surface 132B, whereas the hooks 164 may be provided proximate to a rear end of the second surface 132B. The pivotal panel 162 is operable between a folded position lying parallel with the second surface 132B (FIG. 2), and an unfolded position erected from the second surface 132B (FIG. 4).

Figure 3:
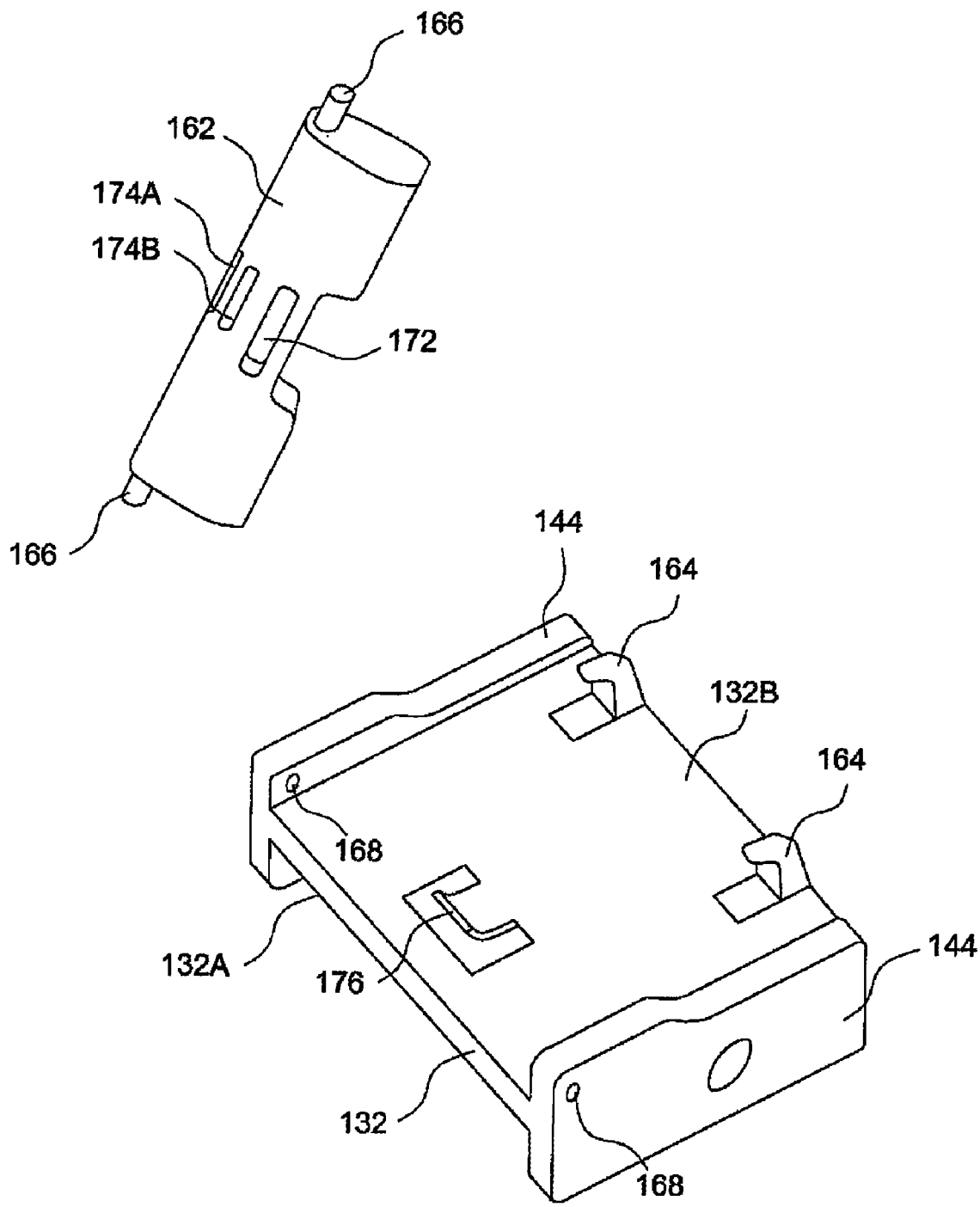
FIG. 3 is an exploded view illustrating how a pivotal panel is assembled on a support base of the mounting platform, according to one embodiment of the present invention.

FIG. 3 is an exploded view illustrating how the pivotal panel 162 is assembled on the second surface 132B of the support base 132 according to one embodiment of the present invention. Two opposite edges of the pivotal panel 162 may be provided with protruding pins 166 aligned with each other, and adapted to engage with openings 168 provided on the two flanges 144 to define the pivot axle of the pivotal panel 162. A middle portion of the pivotal panel 162 may also include a through-hole 172, and detent slits 174A and 174B adapted to engage with a resilient rib 176 protruding from the second surface 132B. When the pivotal panel 162 is folded parallel with the second surface 132B, the resilient rib 176 engages with the detent slit 174A for locking the pivotal panel 162 in place. When the pivotal panel 162 is rotated to an erected position, the resilient rib 176 can engage with the detent slit 174B for locking the erected position of the pivotal panel 162.

Figure 4:
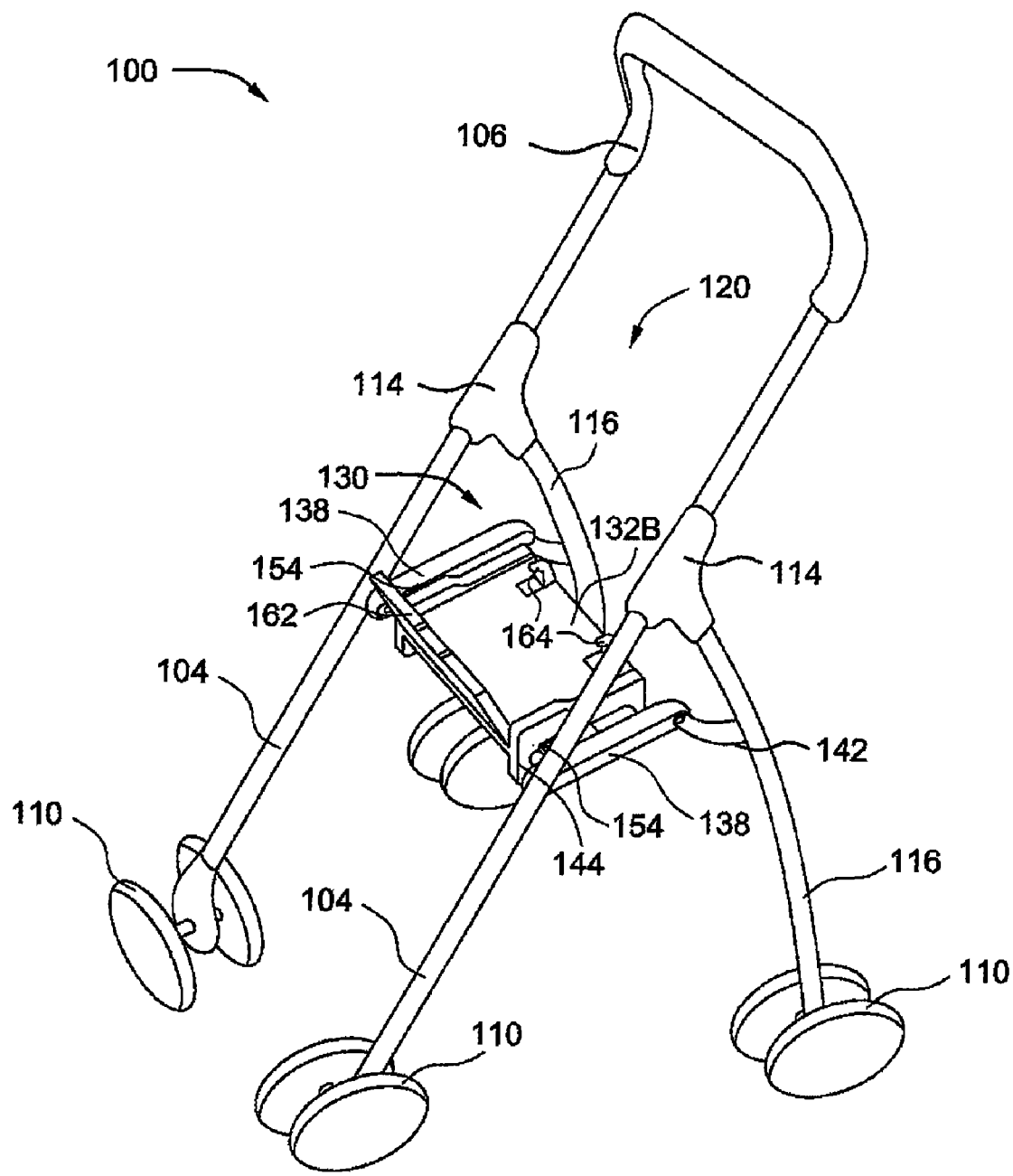
FIG. 4 is a schematic view illustrating the pivotal panel shown in FIG. 3 in an unfolded position.
Figure 5:
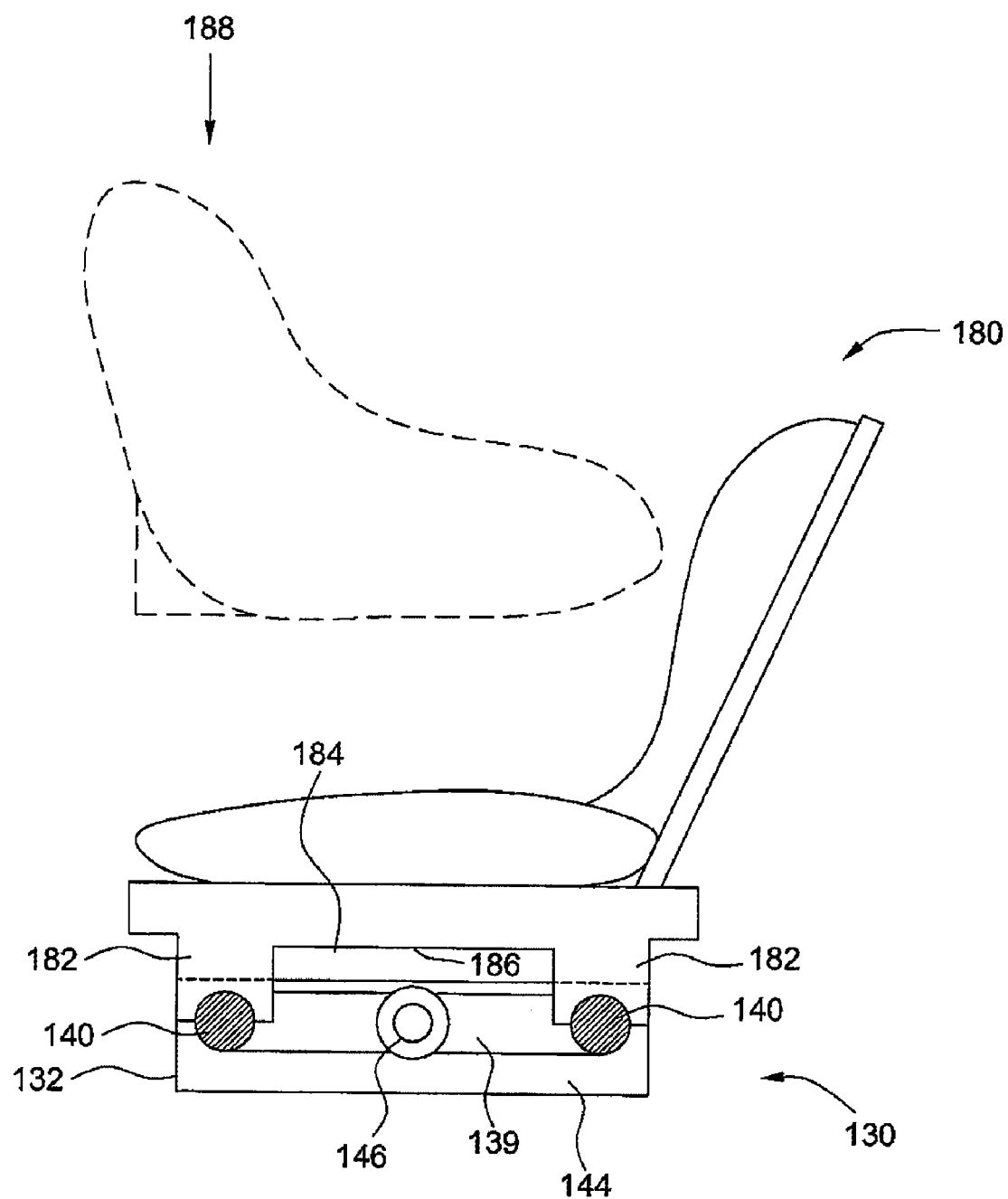
FIG. 5 is a partial cross-sectional view illustrating the attachment of a first infant carrier on the mounting platform of the support structure, according to one embodiment of the present invention.

Operation and use of the mount platform 130 is described hereafter with reference to FIGS. 1, 4, 5, 6 and 7. FIG. 5 is a partial cross-sectional view illustrating the attachment of a first infant carrier 180 on the mounting platform 130, whereas FIG. 6 is a schematic view illustrating the attachment of a second infant carrier 190 on the mounting platform 130. The first infant carrier 180 may exemplary be a detachable stroller seat, and the second infant carrier 190 may be an infant car seat. Referring to FIGS. 1 and 5, when the support base 132 is in the first position, the first surface 132A of the support base 132 is oriented upward and located at a height that is lower than the brackets 136, whereas the second surface 132B is oriented downward. As better shown in FIG. 5, the support base 132 thereby leaves a clearance 184 that allows a first fastener structure 182 provided on a bottom of the first infant carrier 180 to engage with a first coupling structure of the mounting platform 130 provided on the two opposite sides of the support base 132. In one embodiment, the transversal rods 140 of the brackets 136 may be used as the first coupling structure. More specifically, the first fastener structure 182 may exemplary include clasping members that can tightly grip the transversal rods 140. In alternate embodiments, the first fastener structure 182 may also include other types of structures, such as hooks, clamps, engaging sockets or the like. With the first infant carrier 180 securely mounted on the frame 102, the support structure 100 may be used as a stroller, or may even accept a portable infant carrier 188 (e.g., an infant car seat) on the first infant carrier 180.

Referring to FIGS. 4 and 6, when a user wants to mount the second infant carrier 190 (e.g., an infant car seat) on the support structure 100, the first infant carrier 180 is removed, the latch 152 is unlocked, and the support base 132 is rotated about 180 degrees until its second surface 132B is oriented upward and faces the accommodation space 120 to provide clearance for the second coupling structure 160. The pivotal panel 162 can then be unfolded until it reaches the erected position shown in FIG. 4. This erected position can be reached when the resilient rib 176 engages with the detent slit 174B. Subsequently, the second infant carrier 190 may be placed in the accommodating space 120 in a recline angle, and the second coupling structure 160 can be engaged with a second fastener structure 192 provided on a bottom of the second infant carrier 190. In one embodiment, the second fastener structure 192 may exemplary include a hook 194 and retainer loops 196 that can respectively engage with the through-hole 172 of the pivotal panel 162 and the hooks 164 on the second surface 132B of the support base 132. The hook 194 may be provided at a side proximate to a rear of the second infant carrier 190, while the retainer loops 196 may be provided at an opposite side proximate to the front of the second infant carrier 190. After being attached, the second infant carrier 190 can have its front facing the rear of the support structure 100.

FIG. 7 is a schematic enlarged view illustrating how the pivotal panel 162 can be engaged with the second fastener structure 192, according to one embodiment of the present invention. The bottom surface of the second infant carrier 190 may include a recessed portion 198 provided proximate to the hook 194. When the second infant carrier 190 is placed on the support base 132, a distal edge of the pivotal panel 162 can at least partially engage in the recessed portion 198, whereas the hook 194 engages the through-hole 172 of the erected pivotal panel 162. The erected pivotal panel 162 and hooks 164 of the second coupling structure 160 can therefore provide multiple anchor points for securely affixing the second infant carrier 190 on the support base 132.

It is worth noting that the second surface 132B of the support base 132 lies at a level higher than the brackets 136 when the support base 132 is rotated to the second position. If a user attempts to mount the first infant carrier 180 when the support base 132 is in the second position, the second surface 132B and/or elements protruding there-from (e.g., the pivotal panel 162, the flanges 144) may abut against a bottom surface 186 of the first infant carrier 180 (see FIG. 5) and prevent engagement of the first fastener structure 182 with the first coupling structure provided on the brackets 136. Improper positioning of the support base 132 can therefore be prevented when either of the first and second infant carrier is assembled on the mounting platform 130.

At least one advantage of the system and method described herein is the ability to configure the support structure for accommodating different types of infant carriers. Accordingly, more versatile use of the support structure is advantageously permitted.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A support structure adapted to mount at least a first infant carrier and a second infant carrier, comprising:
   a frame having an accommodation space; and
   a mounting platform provided on the frame, wherein the mounting platform includes:
      a first coupling structure adapted to engage with a first fastener structure of the first infant carrier placed in the accommodation space;
      a second coupling structure adapted to engage with a second fastener structure of the second infant carrier placed in the accommodation space; and
      a support base movably mounted on the frame, the support base being operable to rotate relative to the frame between a first position and a second position,
      wherein the first position of the support base enables engagement of the first coupling structure with the first fastener structure, and
      the second position of the support base enables engagement of the second coupling structure with the second fastener structure.

2. The support structure according to claim 1, wherein the support base includes a first surface and a second surface opposite the first surface, the second coupling structure being provided on the second surface of the support base.

3. The support structure according to claim 2, wherein the first surface is oriented toward the accommodation space when the support base is in the first position.

4. The support structure according to claim 3, wherein the first coupling structure is provided on at least one of a plurality of brackets through which the support base is pivotally mounted with the frame.

5. The support structure according to claim 4, wherein the first surface of the support base is located below the brackets to provide clearance for engagement of the first coupling structure with the first fastener structure, when the support base is in the first position.

6. The support structure according to claim 5, wherein the second surface of the support base is located above the brackets for blocking engagement of the first coupling structure with the first fastener structure, when the support base is in the second position.

7. The support structure according to claim 5, wherein the first fastener structure includes a clasp adapted to grip a portion of the brackets.

8. The support structure according to claim 2, wherein the second coupling structure includes a pivotal panel assembled on the second surface of the support base.

9. The support structure according to claim 8, wherein the pivotal panel is movable between a folded position lying substantially parallel with the second surface and an unfolded position erected from the second surface.

10. The support structure according to claim 9, wherein the pivotal panel being erected from the second surface is adapted to engage with a hook of the second fastener structure when the support base is in the second position.

11. The support structure according to claim 9, wherein the second surface comprises a spring element, the pivotal panel is coupled with the second surface via the spring element to secure the pivotal panel in at least one of the folded position and the unfolded position.

12. The support structure according to claim 1, further comprising a latch for locking the support base in either of the first and second position.

13. The support structure according to claim 12, wherein the latch comprises a bolt, the support base has a hole, and the bolt is movable to detachably engage with the hole.

14. The support structure according to claim 1, configured as a baby stroller apparatus.

15. The support structure according to claim 1, wherein the first infant carrier is a stroller seat.

16. The support structure according to claim 1, wherein the second infant carrier is an infant car seat.

* * * * *